US008874514B2

(12) United States Patent
Grosset et al.

(10) Patent No.: US 8,874,514 B2
(45) Date of Patent: *Oct. 28, 2014

(54) ENCAPSULATION OF MULTIPLICITY AND SPARSITY IN MULTIDIMENSIONAL QUERY EXECUTION SYSTEMS

(75) Inventors: Robin N. Grosset, Ottawa (CA); Jose Vazquez, Union City, NJ (US); Yu Zou, Middletown, NJ (US)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/615,310

(22) Filed: Sep. 13, 2012

(65) Prior Publication Data

US 2013/0097149 A1    Apr. 18, 2013

Related U.S. Application Data

(63) Continuation of application No. 13/276,194, filed on Oct. 18, 2011, now Pat. No. 8,463,745.

(51) Int. Cl.
*G06F 17/30* (2006.01)
(52) U.S. Cl.
CPC .......... *G06F 17/30592* (2013.01); *G06F 17/30* (2013.01)
USPC ........................................................ 707/635
(58) Field of Classification Search
None
See application file for complete search history.

(56) References Cited

U.S. PATENT DOCUMENTS

| 7,698,264 | B2 |    | 4/2010  | Leikucs et al.            |
|-----------|----|----|---------|---------------------------|
| 7,809,678 | B2 | *  | 10/2010 | Berger et al. ..... 707/606 |
| 8,244,667 | B1 | *  | 8/2012  | Weinberger et al. ..... 707/603 |
| 2006/0122807 | A1 | | 6/2006 | Wittkowski |
| 2007/0053513 | A1 | | 3/2007 | Hoffberg |
| 2007/0130116 | A1 | | 6/2007 | Cras et al. |
| 2008/0114793 | A1 | | 5/2008 | Grosset et al. |
| 2008/0234990 | A1 | | 9/2008 | Bowers |

FOREIGN PATENT DOCUMENTS

| CA | 2674332     | 2/2010 |
|----|-------------|--------|
| CN | 102306176 A1 | 1/2012 |

OTHER PUBLICATIONS

US Patent Application, dated Dec. 18, 2013 for U.S. Appl. No. 14/133,339 (54.77C2), entitled "Encapsulation of Multiplicity and Sparsity in Multidimensional Query Execution Systems" filed Dec. 18, 2013 by inventor Robin N. Grosset et al., pp. 1-33.

Examination Report Under Section 18(3), dated Sep. 27, 2013, for Application No. GB1216679.9, Reference No. CA920110080GB1, pp. 1-5.

Combined Search and Examination Report under Sections 17 and 18(3), Jan. 16, 2013, Total 8 pp.

Feng, J., H. SI, and Y. Feng, "Indexing and Incremental Updating Condensed Data Cube", Proceedings of the 15th International Conference on Scientific and Statistical Database Management (SSDBM'03), 2003 IEEE, Total 10 pp.

(Continued)

*Primary Examiner* — Wilson Lee
(74) *Attorney, Agent, or Firm* — Janaki K. Davda; Konrad, Raynes, Davda and Victor LLP

(57) ABSTRACT

Provided are techniques for processing a multidimensional query. For each multidimensional expression in the multidimensional query, the multidimensional expression is evaluated to generate a representation that includes an evaluation context, a degeneration status, and condensed value storage that does not store data that would be replicated due to degeneration, and the representation is stored.

8 Claims, 6 Drawing Sheets

(56) References Cited

OTHER PUBLICATIONS

Furtado, P. and H. Madeira, "FCompress: A New Technique for Queriable Compression of Facts and Datacubes", 2000 IEEE, Total 17 pp.
Preliminary Remarks, dated Dec. 18, 2013, for U.S. Appl. No. 14/133,339 (54.77C2), entitled "Encapsulation of Multiplicity and Sparsity in Multidimensional Query Execution Systems" filed Dec. 18, 2013 by inventor Robin N. Grosset et al., pp. 1-2.
English Abstract for CN102306176A1, published on Jan. 4, 2012, Total 2 pp.
Notice of Allowance, dated Feb. 1, 2013, for U.S. Appl. No. 13/276,194, filed Oct. 18, 2011, entitled "Encapsulation of Multiplicity and Sparsity in Multidimensional Query Execution Systems", invented by R.N. Grosset etal., Total 7 pp.
Reply to Search and Examination Report, dated May 14, 2013, for Application No. GB1216679.9, Total 2 pp.
Amendment 1, Jan. 7, 2013, for U.S. Appl. No. 13/276,194, filed on Oct. 18, 2011 by R.N. Grosset et al., Total 8 pp. [54.77 {Amend1}].
Office Action 1, Oct. 5, 2012, for U.S. Appl. No. 13/276,194, filed on Oct. 18, 2011 by R.N. Grosset et al., Total 40 pp. [54.77 {OA1)].
IBM Corp., "Cognos Now! Documentation", [online], [retrieved on Oct. 12, 2011], retrieved from the Internet at <URL: http://www-947.ibm.com/support/entry/portal/documentation/software/In . . . >, 1pp.
Pasumansky, M., "Microsoft OLAP", [online], Oct. 22, 2008, retrieved from the Internet at <URL: http://sqlblog.com/blogs/moshafarchive/2008/10/22/optimizing-mdx-aggregation-functions.aspx>, 6 pp.
Wang, J., "MDX and DAX Topics", [online], Jan. 6, 2011, [retrieved on Oct. 17, 2011], retrieved from the Internet at <URL: http://mdxdax.blogspot.com/2011/01/mdx-iif-execution-plans-and-plan-hints.html>, 5 pp.
U.S. Appl. No. 13/276,194, filed on Oct. 18, 2011, entitled "Encapsulation of Multiplicity and Sparsity in MultiDimensional Query Execution Systems", invented by Grosset, R.N., J. Vazquez, and Y. Zou, Total pp. 35 [54.77 (Appln)].
Preliminary Amendment, Sep. 13, 2012, for U.S. Appl. No. 13/276,194, filed on Oct. 18, 2011 by R.N. Grosset et al., Total pp. 6 [54.77 (PrelimAmend)].
Pasumansky, M., "Optimizing MDX Aggregation Fuctions", Microsoft OLAP, [online], Oct. 22, 2008, retrieved from the Internet at <URL: http://sqlblog.com/blogs/mosha/archive/2008/10/22/optimizing-mdx-aggregation-functions. aspx>, Total 6 pp.

* cited by examiner

```
a = first value in A
b = first value in B
calculate i and j: sub-ordinals of 'a' in sets {P0, P1, P2} and {T0, T1, T2, T3}
calculate i' and j': sub-ordinals of 'b' in sets {P0, P1, P2} and {T0, T1, T2, T3}

While(i <= size of set {P0, P1, P2} || i' <= size of set {P0, P1, P2}) {
        calculate i and j: sub-ordinals of 'a' in sets {P0, P1, P2} and {T0, T1, T2, T3}
        calculate i' and j': sub-ordinals of 'b' in sets {P0, P1, P2} and {T0, T1, T2, T3} if (i > i') {
                value=f(null, b);
                b = next value in B;
                continue;
    } else if(i < i') {
                value=f(a, null);
                a = next value in A;
                continue;
    } else {
                if (j > j') {
                    value=f(null, b);
                    b = next value in B;
                    continue;
                } else if(j < j') {
                    value=f(a, null);
                    a = next value in A;
                    continue;
                } else {
                    value=f(a,b);
                    a = next value in A;
                    b = next value in B;
                    continue;
                }
    }
}
```

FIG. 4

ENCAPSULATION OF MULTIPLICITY AND SPARSITY IN MULTIDIMENSIONAL QUERY EXECUTION SYSTEMS

CROSS-REFERENCE TO RELATED APPLICATION

This application is a continuation of U.S. patent application Ser. No. 13/276,194, filed Oct. 18, 2011, which application is incorporated herein by reference in its entirety.

BACKGROUND

Embodiments of the invention relate to encapsulation of multiplicity and sparsity in multidimensional query execution systems.

On-line analytical processing (OLAP) databases present data in a multidimensional data model. The multidimensional data model includes hierarchies. Hierarchies (also referred to as dimensions) are collections of related identifiers, or attributes (e.g., product, market, time, channel, scenario, or customer) of the data values of the system. The data values belonging to a particular hierarchy generally have some sort of structure, such as hierarchical. A multidimensional data model with three hierarchies may be represented as a cube.

Multidimensional expressions (MDX) may be described as a query language for OLAP databases. The MDX query language is also a calculation language that allows measures to be calculated (e.g., as a result of performing operations, such as adding/multiplying/subtracting/function/etc.). Multidimensional expressions are often referred to as MDX expressions. An MDX query may be referred to as a multidimensional query.

An MDX expression is evaluated for a collection of cells in a multidimensional cube. This collection of cells is called the context of the evaluation (i.e., "evaluation context"). A context tuple is the coordinates of a cell in the evaluation context. A context tuple may be represented using members, one from each hierarchy. The evaluation context may be represented by a set of context tuples.

Some systems allow for a block execution mode. In block execution mode, an MDX expression is evaluated once for the entire evaluation context, and the data is fetched from the data source in one query.

The following example MDX Query (1) for a calculated measure illustrates the concept of block execution and evaluation context:

```
MDX Query (1)
    WITH
        MEMBER
            [Measures].[C1] as '
            [Measures].[Unit Sales]*1.2'
        SELECT
            {[Measures].[C1]}
            ON COLUMNS,
            {[Product].[Product Family].MEMBERS}
            ON ROWS
        FROM
            [Sales]
```

In MDX Query (1), the WITH clause indicates a calculated measure. In particular, MDX expression "C1" is calculated as "Unit Sales*1.2". The SELECT clause indicates that "C1" is to be listed for the columns and that members of the "Product Family" are to be listed for the rows. The FROM clause indicates that data is to be obtained from the "Sales" cube.

MDX Query (1) asks for the evaluation of calculated measure C1 for each of the three products in the [Product Family] level. In block execution mode, C1 is evaluated once for all three tuples in the set [Product].[Product Family].MEMBERS, and there is one data retrieval request of [Measures].[Unit Sales] for all three products. The evaluation context for the calculated measure C1 is the set representing the three cells.

The evaluation of an MDX expression in block execution mode may result in multiple values, with one value per cell. Some systems keep the multiple values for a calculated measure in an array and match the values to the evaluation context by their positions in the array. Because a value's position in the array does not fully specify the corresponding tuple in the evaluation context, matching based on the position requires reconstruction of the relationship between the value and the tuple as the evaluation context changes during the evaluation. Such matching is complicated and may cause erroneous results for certain MDX expressions.

MDX expressions that have partial or no reference to the evaluation context may result in multiplicity (i.e., the same value for all cells that differ only in members of the unreferenced hierarchies). That is, if a calculated measure does not reference a particular hierarchy of the evaluation context, then that particular hierarchy is said to be degenerated. Also, unreferenced hierarchies are called degenerated hierarchies for the MDX expression. The member M3 is said to have two operands: M1 and M2. For example, to calculate the MDX expression M3 in the MDX Query (2), first the MDX expression M1 and the MDX expression M2 are evaluated, and then the product of M1 and M2 is evaluated.

```
MDX Query (2)
    WITH
        MEMBER
            [Measures].[M1] as '
            [Customers].CURRENTMEMBER.CHILDREN.COUNT'
        MEMBER
            [Measures].[M2] as '
            [Product].CURRENTMEMBER.CHILDREN.COUNT'
        MEMBER
            [Measures].[M3]as 'M1*M2'
    SELECT
        {[Customers].[Country].MEMBERS}
        ON COLUMNS,
        {[Product].[Product Family].MEMBERS}
        ON ROWS
    FROM
        [Sales]
    WHERE
        ([Measures].[M3])
```

In MDX Query (2), the WITH clause indicates that M1, M2, and M3 are calculated measures. In particular, "M1" is calculated as "CURRENTMEMBER.CHILDREN.COUNT"; "M2" is calculated as "CURRENTMEMBER.CHILDREN.COUNT"; and M3 is calculated as "M1*M2". The SELECT clause indicates that members of "Country" are to be listed for the columns and that members of "Product Family" are to be listed for the rows. The FROM clause indicates that data is to be obtained from the "Sales" cube. The WHERE clause indicates that data returned by the SELECT statement should be filtered by the member M3 of the Measures dimension. Data in the intersection of the members returned by the SELECT clause and member M3 is returned.

The MDX expression for M1 evaluates to the same value for all three products because the calculation of M1 does not reference the members of the Product hierarchy on the evaluation context. This is an example of multiplicity. The resulting evaluation of M1 is illustrated in Table (1):

Table (1) for M1 (evaluated in MDX Query (2))

|  | Canada | Mexico | USA |
|---|---|---|---|
| Drink | 1 | 9 | 3 |
| Food | 1 | 9 | 3 |
| Non-Consumable | 1 | 9 | 3 |

Such repetitions consume extra evaluation time and additional memory, especially when the set for the product becomes very large. As mentioned above, some systems keep the multiple values for a calculated measure in an array. Some of these systems may handle multiplicity by omitting the repeated values in the array for the calculated measure, without keeping the full information of which values are omitted. Omitting repeated values requires matching of one value to multiple context tuples.

Operations among different MDX expressions (e.g., M1 and M2 of MDX Query (2)) require matching values that correspond to the same context tuple from the participating MDX expressions. Such matching compares arrays used to store values for evaluated MDX expressions, where repeated values may be omitted for different context tuples in different MDX expressions. In addition, the logic for matching values is implemented for each operator and function in the MDX language.

Data sparsity in multidimensional systems often causes MDX expressions to result in many empty cells. Some systems enumerate the context tuples and perform operations for the corresponding values. Performing operations on these empty cells may be expensive for large evaluation contexts.

SUMMARY

Provided are a method, computer program product, and system for processing a multidimensional query. For each multidimensional expression in the multidimensional query, the multidimensional expression is evaluated to generate a representation that includes an evaluation context, a degeneration status, and condensed value storage that does not store data that would be replicated due to degeneration, and the representation is stored.

BRIEF DESCRIPTION OF THE SEVERAL VIEWS OF THE DRAWINGS

Referring now to the drawings in which like reference numbers represent corresponding parts throughout:

FIG. 2 is formed by FIG. 2A and FIG. 2B.

FIG. 4 illustrates pseudo-code for performing iteration for an operation (e.g., adding/multiplying/subtracting/function/ etc.) having multiple operands in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
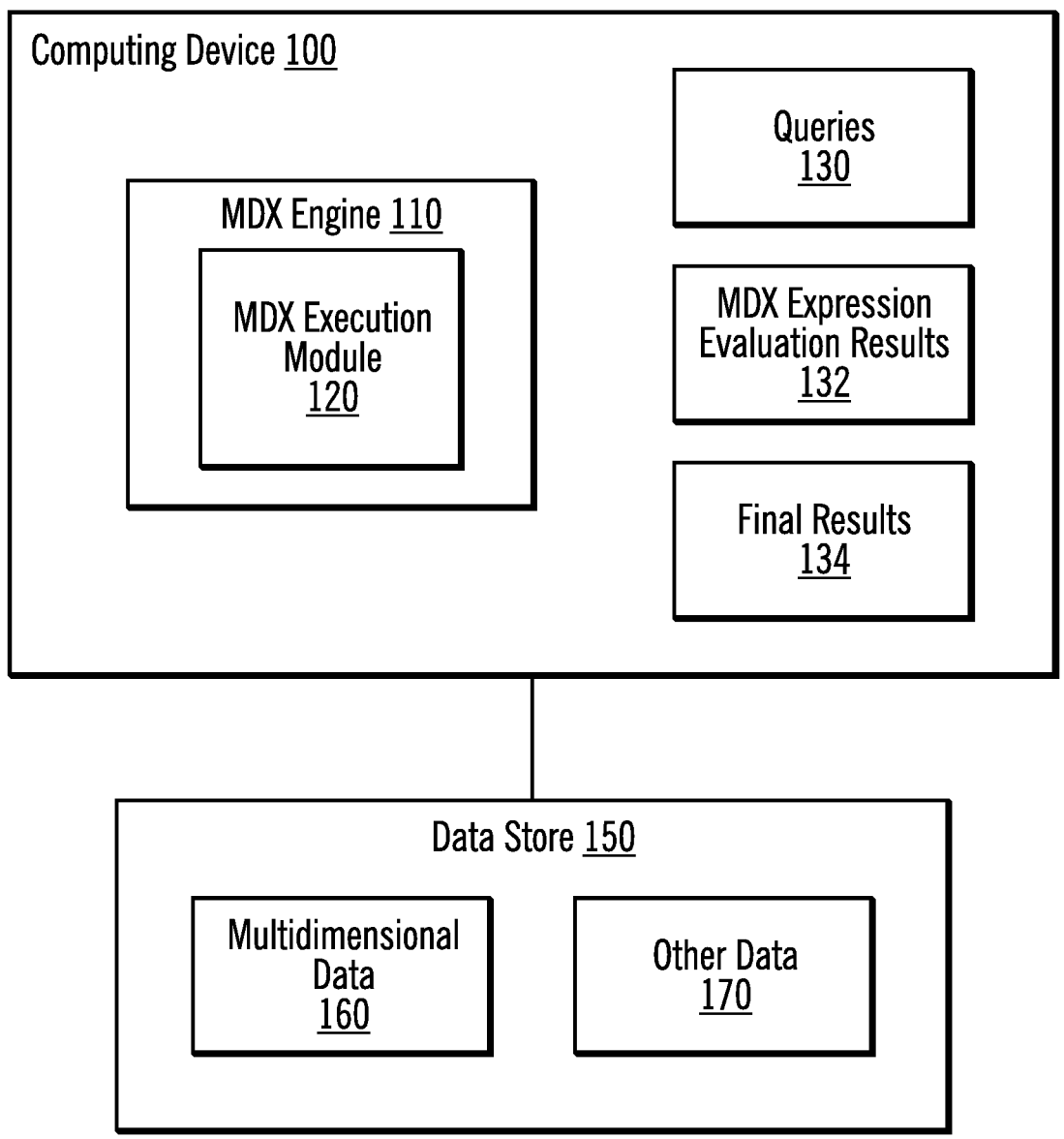
FIG. 1 illustrates, in a block diagram, a computing environment in accordance with certain embodiments.

FIG. 1 illustrates, in a block diagram, a computing environment in accordance with certain embodiments. A computing device 100 is coupled to a data store 150 (e.g., via a communication path, such as a network). The computing device 100 includes an MDX engine 110, queries 130, MDX expression evaluation results 132, and final results 134 (from evaluation of queries 130). The MDX engine 110 includes an MDX execution module 120.

The data store 150 includes multidimensional data 160 and other data 170 (e.g., relational data).

The MDX engine 110 receives a query 130 as input, uses the MDX execution module 120 to evaluate (i.e., execute) the query 130 using data from the data store 150. While evaluating the query 130, the MDX execution module 120 generates MDX expression evaluation results 132. In certain embodiments, the MDX expression evaluation results 132 comprises a representation that includes condensed value storage that does not store data that would be replicated due to degeneration, a degeneration status, and an evaluation context. The MDX execution module 120 uses the MDX expression evaluation results 132 to generate and output results 134 from the evaluation of the query 130.

The MDX execution module 120 provides a representation of the evaluation of the MDX expression based on the evaluation context, which simplifies matching values to context tuples. In particular, the MDX execution module 120 defines a representation for the evaluation of MDX expressions within its evaluation context. The representation contains the evaluation context, the degeneration status, and condensed value storage using the degeneration information. The condensed value storage is "condensed" in that data that would be replicated due to degeneration is not stored. In certain embodiments, the condensed value storage is a table. Because the evaluation context is present in the representation and the link between the condensed value storage and the evaluation context is explicit, the matching of values to context tuples is clearly defined.

The MDX execution module 120 provides representation of the evaluation of the MDX expression with degeneration. The MDX execution module 120 saves memory by storing evaluated MDX expressions in the subspace that excludes the degeneration. Because the repetitive cells are stored once, any operation applied to them is performed once, thus reducing the query evaluation (i.e., execution) time as well. The concept of degeneration may be illustrated with reference to MDX Query (2). In MDX Query (2), because M1 is evaluated to the same values for all products (i.e., [Measures].[M1] as '[Customers].CURRENTMEMBER.CHILDREN. COUNT'), the evaluated result is said to be degenerated for the Product hierarchy. The MDX execution module 120 represents the evaluation result of M1 by noting the degeneration and storing values using only non-degenerated hierarchies. Table (2) illustrates a representation for M1 in accordance with embodiments of the invention:

Table (2) for M1 (evaluated in MDX Query (2))

| | Canada | Mexico | USA |
|---|---|---|---|
| | 1 | 9 | 3 |

Degeneration: {Drink, Food, Non-Consumable}
Evaluation Context: {Drink, Food Non-Consumable} X {Canada, Mexico, USA}

That is, for the evaluation of MDX expression M1 from MDX Query (2), the MDX execution module 120 saves condensed value storage (i.e., Table (2)), the degeneration status, and the evaluation context.

The MDX execution module 120 provides an iteration technique for multiple MDX expressions to enable consistent treatment of any operation between multiple expressions. In particular, the MDX execution module 120 defines an iteration technique to match the values for multiple MDX expressions (i.e., M1 and M2 from MDX Query (2) to evaluate M3) to facilitate operations among the MDX expressions. The iteration technique defines the degeneration for the result of the operation as the common degeneration of the participating MDX expressions and retrieves the value from each MDX expression based on the common degeneration. With reference to MDX Query (2), the resulting evaluation of M1 and M2 is illustrated in Table (2) (shown again) and Table (3), respectively:

Table (2) for M1 (evaluated in MDX Query (2))

| | Canada | Mexico | USA |
|---|---|---|---|
| | 1 | 9 | 3 |

Degeneration: {Drink, Food, Non-Consumable}
Evaluation Context: {Drink, Food Non-Consumable} X {Canada, Mexico, USA}

Table (3) for M2 (evaluated in MDX Query (2))

| | |
|---|---|
| Drink | 3 |
| Food | 15 |
| Non-Consumable | 5 |

Degeneration: {Canada, Mexico, USA}
Evaluation Context: {Drink, Food Non-Consumable} X {Canada, Mexico, USA}

For M1 and M2, there is no common degeneration, so the values are retrieved and the multiplication operation is performed for each Product and Customer pair. The resulting evaluation of M3 is illustrated in Table (4):

Table (4) for M3 (evaluated in MDX Query (2))

| | Canada | Mexico | USA |
|---|---|---|---|
| Drink | 3 | 27 | 9 |
| Food | 15 | 135 | 45 |
| Non-Consumable | 5 | 45 | 15 |

Degeneration: None
Evaluation Context: {Drink, Food Non-Consumable} X {Canada, Mexico, USA}

In MDX Query (3), the two operand MDX expressions N1 and N2 share a common degeneration:

```
WITH
    MEMBER
        [Measures].[N1] as '
        [Customers].CURRENTMEMBER.CHILDREN.COUNT'
    MEMBER
        [Measures].[N2] as '
        [Product].CURRENTMEMBER.CHILDREN.COUNT'
    MEMBER
        [Measures].[N3]as 'N1*N2'
SELECT
    {[Customers].[Country].MEMBERS}
    ON AXIS(0),
    {[Product].[Product Family].MEMBERS}
    ON AXIS(1),
    {[Time].[1997],[Time].[1998]}
    ON AXIS(2)
FROM
    [Sales]
WHERE
    ([Measures].[N3])
```

With reference to MDX Query (3), the resulting evaluation of N1 and N2 is illustrated in Table (5) and Table (6), respectively:

Table (5) for N1 (evaluated in MDX Query (3))

| | Canada | Mexico | USA |
|---|---|---|---|
| | 1 | 9 | 3 |

Degeneration: {Drink, Food, Non-Consumable} X {1997, 1998}
Evaluation Context: {Drink, Food Non-Consumable} X {Canada, Mexico, USA} X {1997, 1998}

Table (6) for N2 (evaluated in MDX Query (3))

| | |
|---|---|
| Drink | 3 |
| Food | 15 |
| Non-Consumable | 5 |

Degeneration: {Canada, Mexico, USA} X {1997, 1998}
Evaluation Context: {Drink, Food Non-Consumable} X {Canada, Mexico, USA} X {1997, 1998}

For N1 and N2, there is no common degeneration, so the values are retrieved and the multiplication operation is performed for each Product and Customer pair. The resulting evaluation of N3 is illustrated in Table (7):

Table (7) for N3 (evaluated in MDX Query (3))

| | Canada | Mexico | USA |
|---|---|---|---|
| Drink | 3 | 27 | 9 |
| Food | 15 | 135 | 45 |
| Non-Consumable | 5 | 45 | 15 |

Degeneration: {1997, 1998}
Evaluation Context: {Drink, Food Non-Consumable} X {Canada, Mexico, USA}

The MDX execution module 120 provides an iteration technique for multiple MDX expressions that saves time with sparsity handling. The iteration technique for matching the values also handles data sparsity. In particular, the iteration technique skips empty cells, working only with cells containing data.

For example, for an MDX expression N3=N1+N2, where N1=([Product].CURRENTMEMBER,[Customers].[USA], [Time].[1997]) and N2=([Product].CURRENTMEMBER, [Customers].[USA],[Time].[1998]) in the evaluation context of {Product1, Product2, Product3, Product4, Product5}× {Canada, Mexico, USA}×{1997, 1998}, the resulting evaluation of N1 and N2 is illustrated in Table (8) and Table (9), respectively:

Table (8) for N1

| | |
|---|---|
| Product 1 | 1 |
| Product 2 | |
| Product 3 | 1 |
| Product 4 | |
| Product 5 | |

Degeneration: {Canada, Mexico, USA} x {1997, 1998}
Evaluation Context: {Product1, Product2, Product3, Product4, Product5} x {Canada, Mexico, USA} x {1997, 1998})

Table (9) for N2

| | |
|---|---|
| Product 1 | 1 |
| Product 2 | |
| Product 3 | |
| Product 4 | 1 |
| Product 5 | |

Degeneration: {Canada, Mexico, USA} x {1997, 1998})
Evaluation Context: {Product1, Product2, Product3, Product4, Product5} x {Canada, Mexico, USA} x {1997, 1998})

The MDX execution module 120 executes the iteration technique on three of the five cells to perform the addition operation for N1+N2. The resulting evaluation of N3 is illustrated in Table (10):

Table (10) for N3

| | |
|---|---|
| Product 1 | 2 |
| Product 2 | Skipped |
| Product 3 | 1 |
| Product 4 | 1 |
| Product 5 | Skipped |

Degeneration: {Canada, Mexico, USA} x {1997, 1998}))
Evaluation Context: {Product1, Product2, Product3, Product4, Product5} x {Canada, Mexico, USA} x {1997, 1998})

Thus, the MDX execution module 120 overcomes the complexity and ensures the consistent performance of an MDX block execution by providing a new representation for the evaluation result of MDX expressions, as well as an iteration technique that optimizes the evaluation of operations between multiple MDX expressions. The MDX execution module 120 defines a concept of degeneration as the collection of all tuples in the subspace of the degenerated hierarchies to represent the multiplicity of the MDX expression and incorporates this concept into the representation.

The following MDX Query (4) illustrates a calculated member MDX expression:

```
MEMBER
    [Product].[Total] as '
    SUM(
        FILTER(
            {[Product].[Product Family].MEMBERS},
            ([Time].[All],
            [Customer].[All],
            [Measures].CURRENTMEMBER,
            [Product].CURRENTMEMBER)> 1000))'
```

The MDX execution module 120 evaluates MDX Query (4) for the evaluation context of:
{[Time].[Year].MEMBERS}×{[Customer].[Country].MEMBERS}×{[Product].[Product Family].MEMBERS}×{[Measures].[Unit Sales]}

In MDX Query (4), the Time and Customer hierarchies are independent of the evaluation context because the members to be used in the filter are fixed to a specific member in the hierarchy ([Time].[All] and [Customer].[All]). For the Product and Measures hierarchies, the member to be used is picked from the evaluation context by way of the CURRENTMEMBER construct. In this case, the hierarchies Time and Customer are degenerated, and the degeneration of this MDX expression is the subspace defined by the two dimensional space of:
{[Time].[Year].MEMBERS} and {[Customer].[Country].MEMBERS}

The MDX execution module 120 simplifies matching values to the evaluation context tuples because the evaluation context is explicitly included in the representation of the evaluated MDX expression. The MDX execution module 120 saves memory and evaluation (i.e., execution) time because of the degeneration feature of the representation. The MDX execution module 120 improves the maintainability of the MDX engine 110 by making consistent treatment possible with the iteration technique for multiple MDX expressions. The MDX execution module 120 saves time through the sparsity handling feature of the iteration technique for multiple MDX expressions.

Thus, embodiments provide a new MDX query evaluation representation, a new degeneration technique, and a new iteration technique.

Embodiments provide a technique to encapsulate multiplicity and sparsity by providing a new representation of the evaluated MDX expressions with evaluation context, the degeneration status, and condensed value storage. The evaluation context matches the result of the evaluation with the corresponding tuple in the evaluation context, represents a subspace consisting of all the cells the MDX expression is to be evaluated for, and is the collection of all the cells the MDX expression is to be evaluated for. The degeneration status represents the hierarchies where the result of the evaluation is the same for all cells that differ only in member selections on these hierarchies. The condensed value storage stores the non-empty cells within the subspace of non-degenerated hierarchies. The iteration technique facilitates operations by simultaneously iterating over multiple evaluated MDX expressions, matching values based on the evaluation context, while skipping the empty combinations and taking into consideration of different degeneration status of the MDX expressions.

Figure 2A:
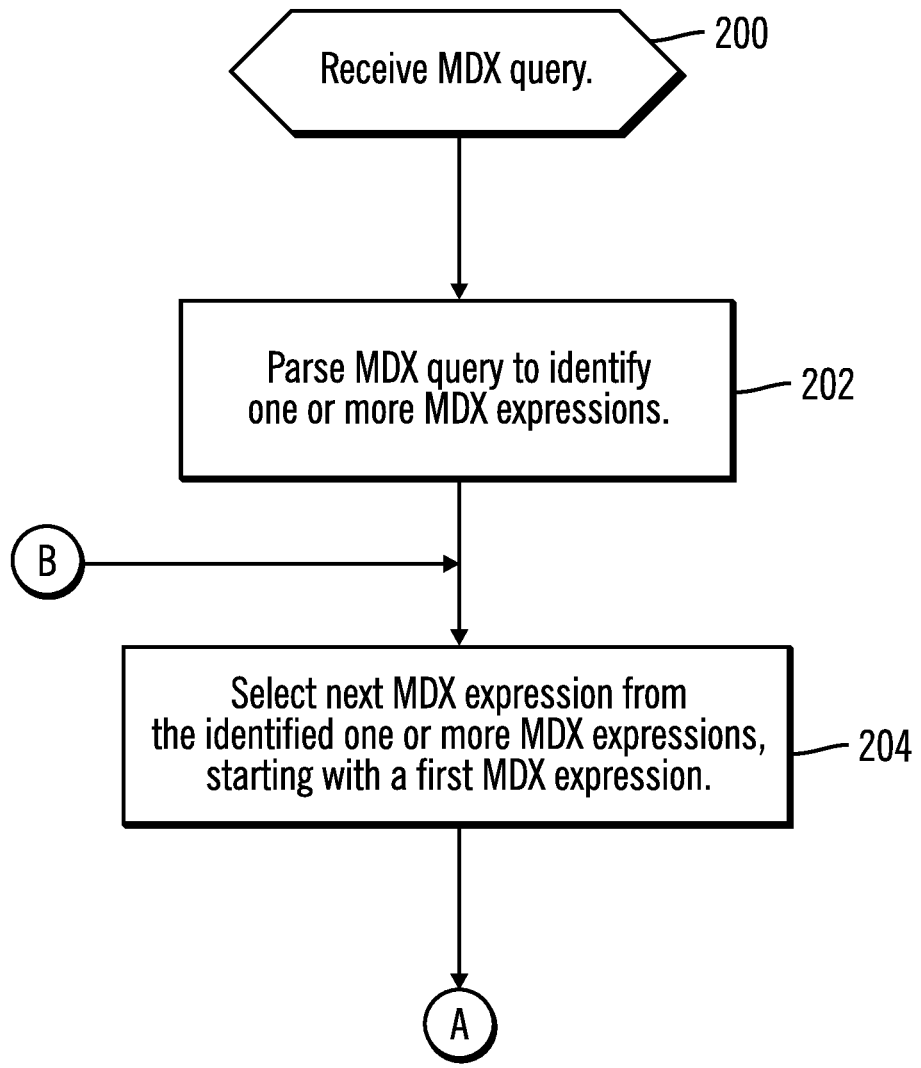
FIG. 2 illustrates, in a flow diagram, logic for processing a multidimensional query in accordance with certain embodiments.
Figure 2B:
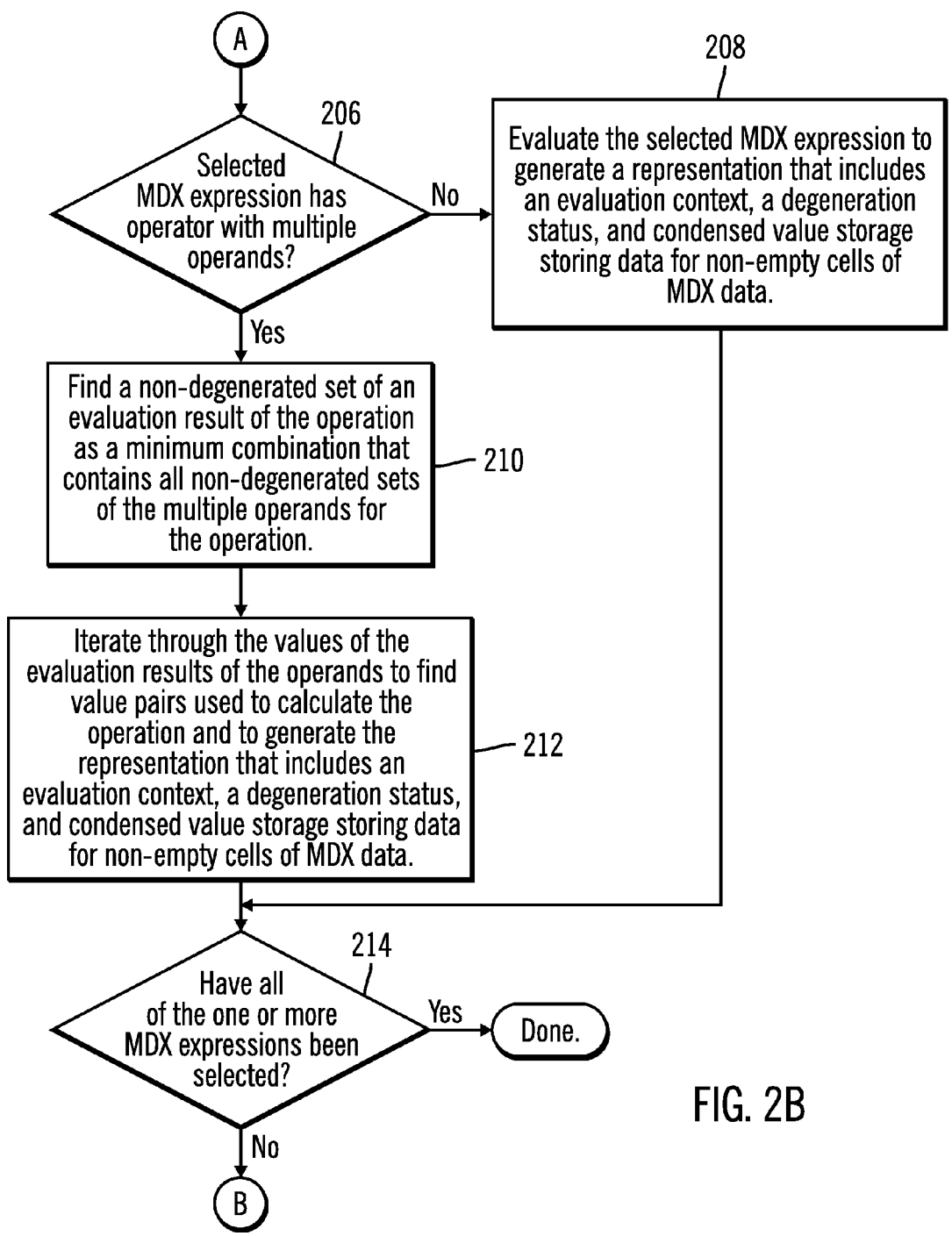

FIG. 2 illustrates, in a flow diagram, logic for processing a multidimensional query in accordance with certain embodiments. FIG. 2 is formed by FIG. 2A and FIG. 2B. Control begins at block 200 with the MDX execution module 120 receiving an MDX query. In block 202, the MDX execution module 120 parses the multidimensional query to identify one or more MDX expressions. In block 204, the MDX execution module 120 selects a next MDX expression from the identified MDX expressions, starting with a first MDX expression. From block 204 (FIG. 2A), processing continues to block 206 (FIG. 2B).

In block 206, the MDX execution module 120 determines whether the selected MDX expression has operator with multiple operands. If so, processing continues to block 210, otherwise, processing continues to block 208. That is, if the MDX expression has a single operand, a new representation is generated, and, if the MDX expression has multiple operands, the evaluation results of the operands are used to generate the new representation.

In block 208, the MDX execution module 120 evaluates the selected MDX expression to generate a representation that includes an evaluation context, a degeneration status, and condensed value storage storing data for non-empty cells of multidimensional data. From block 208, processing continues to block 214.

In block 210, the MDX execution module 120 finds a non-degenerated set of an evaluation result of the operation as a minimum combination that contains all non-degenerated sets of the multiple operands for the operation.

In block 212 the MDX execution module 120 iterates through the values (i.e., the non-empty cells) of the evaluation results of the operands to find value pairs used to calculate the operation for the selected MDX expression and to generate the representation that includes condensed value storage storing data for non-empty cells of multidimensional data, a degeneration status, and an evaluation context.

In block 214, the MDX execution module 120 determines whether all of the one or more MDX expressions have been selected. If not, processing continues to block 204 FIG. 2A), otherwise, processing is done.

Figure 3:
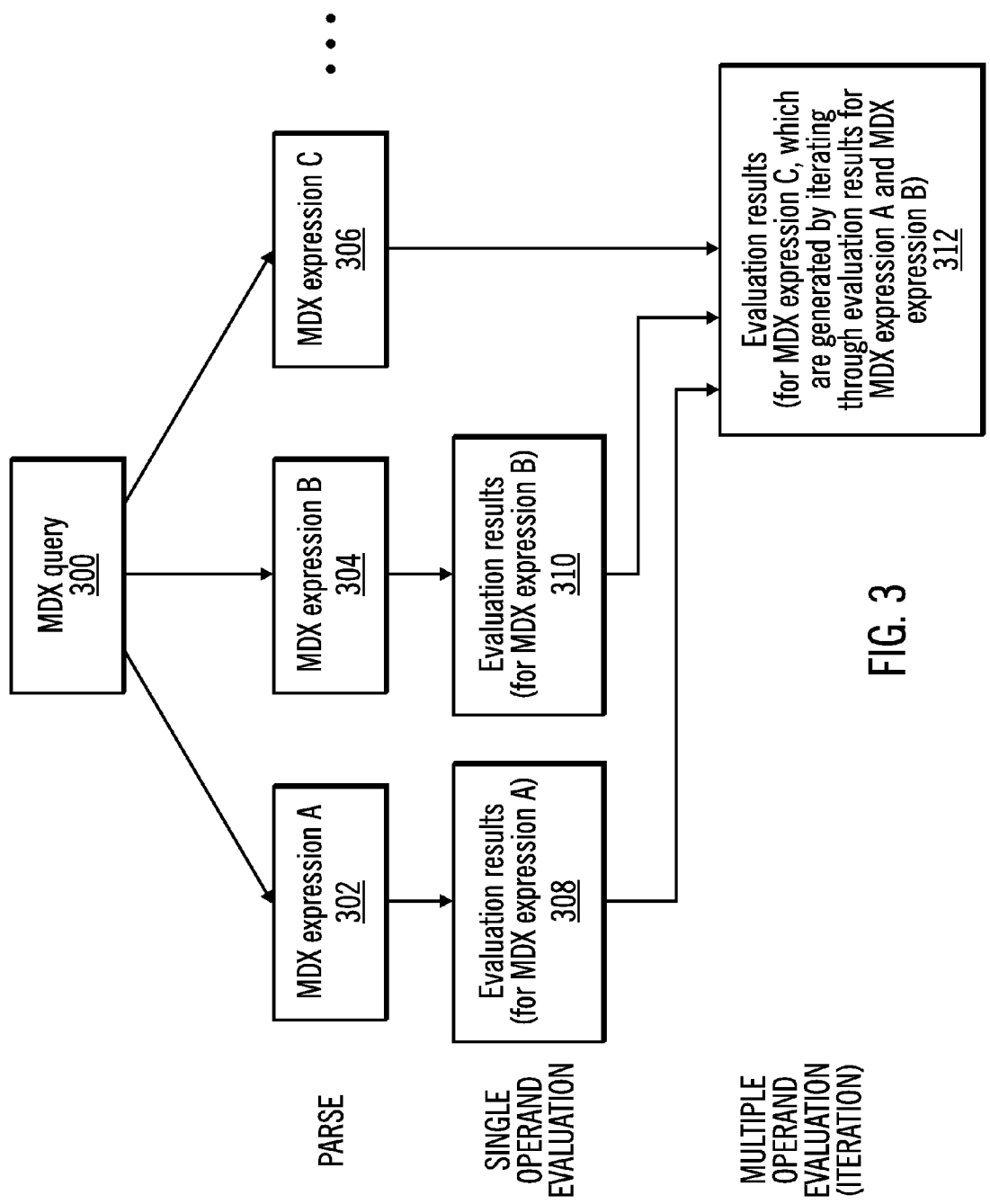
FIG. 3 illustrates, in a block diagram, an example for processing an MDX query in accordance with certain embodiments.

FIG. 3 illustrates, in a block diagram, an example for processing an MDX query in accordance with certain embodiments. An MDX query 300 is parsed to identify the different MDX expressions. In this example, the ellipses indicate that the parsing may result in any number of MDX expressions. For example, the parsing identifies MDX expression A 302, MDX expression B 304, and MDX expression C 306. MDX expression C 306 is calculated by performing an operation on A and B.

In FIG. 3, there are evaluation results 308 for MDX expression A, evaluation results 310 for MDX expression B, and evaluation results 312 for MDX expression C. The evaluation results 312 for MDX expression C are generated by iterating through evaluation results for MDX expression A and MDX expression B.

To enhance understanding of embodiments of the invention, evaluation of the MDX expression C=f(A,B) will be described. The evaluation context of the MDX expression is {P0, P1, P2}×{T0, T1, T2, T3}, which is also represented in Table (11):

TABLE (11)

|  | T0 | T1 | T2 | T3 |
|---|---|---|---|---|
| P0 |  |  |  |  |
| P1 |  |  |  |  |
| P2 |  |  |  |  |

Evaluation Context: {P0, P1, P2} X (T0, T1, T2, T3)

The MDX expression for A has an evaluation context of {P0, P1, P2}×{T0, T1, T2, T3} and has a non-degenerated set of {P0, P1, P2}. The resulting evaluation of A is illustrated in Table (12) and has the values of (Ord: 1, Value=a1):

TABLE (12)

| P0 |  |
|---|---|
| P1 | Ord: 1, Value = a1 |
| P2 |  |

Degeneration: {T0, T1, T2, T3}
Evaluation Context: {P0, P1, P2} X (T0, T1, T2, T3)

The MDX expression for B has an evaluation context of {P0, P1, P2}×{T0, T1, T2, T3} and has a non-degenerated set of {T0, T1, T2, T3}. The resulting evaluation of A is illustrated in Table (13) and has the values of (Ord: 0, Value=b0), (Ord:2, Value=b2):

TABLE (13)

| T0 | Ord: 0, Value = b0 |
|---|---|
| T1 |  |
| T2 | Ord: 2, Value = b2 |
| T3 |  |

Degeneration: {P0, P1, P2}
Evaluation Context: {P0, P1, P2} X (T0, T1, T2, T3)

To evaluate the MDX expression C, the MDX execution module 120 finds a non-degenerated set of the evaluation results as the minimum set that contains all the non-degenerated sets of A and B, which is: {P0, P1, P2}×{T0, T1, T2, T3}. Then, the MDX execution module 120 iterates through values in A and B to find the value pairs used to calculate the value for C.

The MDX expression for C=f(A,B) has an evaluation context of {P0, P1, P2}×{T0, T1, T2, T3} and has a non-degenerated set of {P0, P1, P2}×{T0, T1, T2, T3}. The resulting evaluation of the MDX expression for C is illustrated in Table (14):

TABLE (14)

|  | T0 | T1 | T2 | T3 |
|---|---|---|---|---|
| P0 | Ord: 0, Value = f(null, b0) |  | Ord: 2, Value = f(null, b2) |  |
| P1 | Ord: 4, Value = f(a1, b0) | Ord: 5, Value = f(a1, null) | Ord: 6, Value = f(a1, b2) | Ord: 7, Value = f(a1, null) |
| P2 | Ord: 8, Value = f(null, b0) |  | Ord: 10, Value = f(null, b2) |  |

Degeneration: None
Evaluation Context: {P0, P1, P2} X (T0, T1, T2, T3)

FIG. 4 illustrates pseudo-code 400 for performing iteration for an operation (e.g., adding/multiplying/subtracting/function/etc.) having multiple operands in accordance with certain embodiments. Merely to enhance understanding, a high level description of the pseudo-code is provided herein, and one skilled in the art would understand the full nuances of the pseudo-code. In the pseudo-code, for each non null value a in A and each non null value b in B, the MDX execution module 120 calculates the pairs (i, j) and (i', j') as the ordinals of a and b in each of sets {P . . . } and {T . . . }. The MDX execution module 120 compares the ordinals calculated to determine which of the values is at a lower position in the combined, cross joined set of {P . . . }×{T . . . }. If the value of A is at a lower position, the next result of the iteration is the pair (a, null), and the next non null values to calculate ordinals for are a' and b, where a'=next non null value in A. If the value of B is at a lower position, then the next result of the iteration is (null, b), and the next non null values to calculate ordinals for are a and b', where b'=next non null value in B. If both a and b are at the same position, the next result of the iteration is (a,b), and the next non null values to calculate ordinals for are a' and b', where a'=next non null value in A and b'=next non null value in B.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 5:
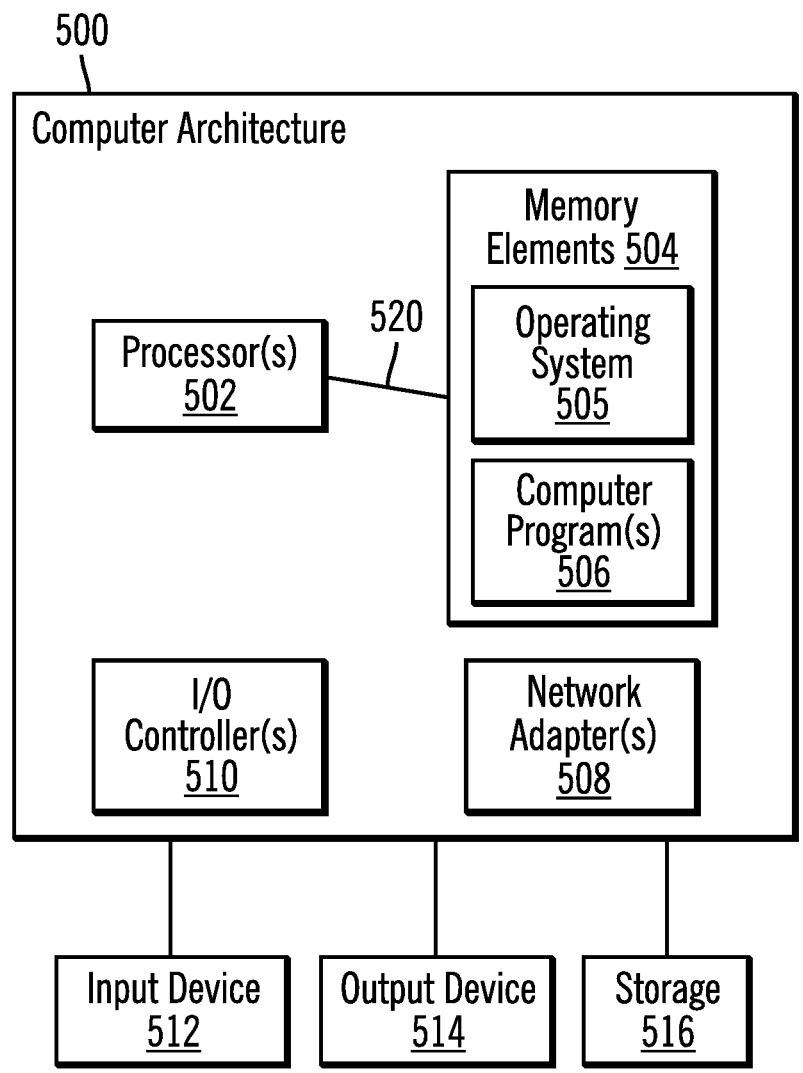
FIG. 5 illustrates, in a block diagram, a computer architecture that may be used in accordance with certain embodiments.

FIG. 5 illustrates a computer architecture 500 that may be used in accordance with certain embodiments. Computing device 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching.

It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for processing a multidimensional query, comprising:
in response to determining that a multidimensional expression includes an operator with multiple operands;
finding, using a processor of a computer, a non-degenerated set of an evaluation result of the operation as a minimum combination that contains non-degenerated sets of the multiple operands for the operation;
evaluating the multidimensional expression by iterating through values of evaluation results of the multiple operands to find value pairs used to calculate the operation and to generate a representation that includes an evaluation context, a degeneration status, and a condensed value storage that does not store data that would be replicated due to degeneration; and
storing the representation.

2. The method of claim 1, wherein the iteration simultaneously iterates over multiple evaluation results, while finding the value pairs based on the evaluation context and while taking into consideration the degeneration status of the operands.

3. The method of claim 1, wherein the iteration skips empty combinations.

4. The method of claim 1, wherein the degeneration status represents hierarchies in which a result of the evaluation of the multidimensional expression is the same for all cells that differ only in member selections on the hierarchies.

5. The method of claim 1, wherein the evaluation context matches a result of the evaluation with a corresponding tuple in the evaluation context.

6. The method of claim 1, wherein the condensed value storage stores non-empty cells within a subspace of non-degenerated hierarchies without storing repeated values for hierarchies that are degenerated.

7. The method of claim 1, further comprising:
parsing the multidimensional query to identify each multidimensional expression.

8. The method of claim 1, further comprising:
in response to determining that the multidimensional expression includes the operator with a single operand, evaluating the multidimensional expression to generate a new representation that includes an evaluation context, a degeneration status, and condensed value storage that does not store data that would be replicated due to degeneration.

* * * * *